US008474501B2

(12) United States Patent
Lippy et al.

(10) Patent No.: US 8,474,501 B2
(45) Date of Patent: Jul. 2, 2013

(54) SYSTEM AND APPARATUS FOR ASSEMBLING AN INFLATABLE INSULATION PANEL

(75) Inventors: William A. Lippy, Lakeland, FL (US);
Addric E. Bassham, Polk City, FL (US);
Douglas F. Kinninger, Lithia, FL (US);
Craig T. Price, Winter Haven, FL (US);
Robert L. Swanson, Windermere, FL (US)

(73) Assignee: Fi-Foil Company, Inc., Auburndale, FL (US)

( * ) Notice: Subject to any disclaimer, the term of this patent is extended or adjusted under 35 U.S.C. 154(b) by 0 days.

(21) Appl. No.: 13/210,734

(22) Filed: Aug. 16, 2011

(65) Prior Publication Data
US 2011/0297328 A1    Dec. 8, 2011

Related U.S. Application Data

(62) Division of application No. 12/200,557, filed on Aug. 28, 2008, now Pat. No. 8,021,734.

(60) Provisional application No. 60/968,429, filed on Aug. 28, 2007.

(51) Int. Cl.
*B32B 37/00*      (2006.01)

(52) U.S. Cl.
USPC ...... 156/359; 156/581; 156/583.1; 156/583.4

(58) Field of Classification Search
USPC ............ 156/358, 359, 580, 581, 583.1, 583.4
See application file for complete search history.

(56) References Cited

U.S. PATENT DOCUMENTS

| 3,619,340 | A | 11/1971 | Jones |
| 4,091,482 | A | 5/1978 | Malcolm |
| 4,091,852 | A | 5/1978 | Jordan et al. |

(Continued)

FOREIGN PATENT DOCUMENTS

| DE | 33 06 228 | 8/1984 |
| GB | 2 273 722 | 6/1994 |

OTHER PUBLICATIONS

Griffith et al, Optimizing the Effective Conductivity and Cost of Gas-Filled Panel Thermal Insulations, Thermal Insulation III, pp. 441-424, Berkeley, CA.

(Continued)

*Primary Examiner* — James Sells
(74) *Attorney, Agent, or Firm* — Robert L. Wolter, Esq.; Beusse Wolter Sanks Mora & Maire, P.A.

(57) ABSTRACT

An inflatable or gas-filled insulation panel comprises an envelope having two outer sheets sealed together along edges of the sheets and at least one of the sheets has an outer reflective surface. The envelope encases a plurality of internal films that include a polymeric film having a plurality of reflective stripes disposed thereon and spaced apart on the films. Seals are formed along the gaps or areas between the reflective stripes on the films by application of heat and pressure, which causes the films to seal to each other and the outer sheets at spaced apart intervals. A channel is formed between the outer edges of the films and the outer sheets, and a valve, disposed at an end of the panel, is in fluid communication with the channel for the injection of a fluid, such as an inert gas or air, to inflate panel.

17 Claims, 6 Drawing Sheets

U.S. PATENT DOCUMENTS

| | | | |
|---|---|---|---|
| 4,262,045 A | 4/1981 | Cheng et al. | |
| 4,284,674 A | 8/1981 | Sheptak | |
| 4,618,517 A | 10/1986 | Simko, Jr. | |
| 4,636,416 A | 1/1987 | Kratel et al. | |
| 4,669,632 A | 6/1987 | Kawasaki et al. | |
| 4,761,197 A * | 8/1988 | Christine et al. | 156/290 |
| 5,270,092 A | 12/1993 | Griffith et al. | |
| 5,454,642 A | 10/1995 | De Luca | |
| 6,322,743 B1 | 11/2001 | Stroobants | |
| 6,342,115 B1 * | 1/2002 | Pourmand et al. | 156/64 |
| 6,755,568 B2 | 6/2004 | Malone et al. | |
| 6,863,949 B2 | 3/2005 | Ehrmanntraut | |
| 2003/0128898 A1 | 7/2003 | Malone et al. | |

OTHER PUBLICATIONS

Griffith et al, Gas-Filled Panel High-Performance Thermal Insulation, Insulation Materials: Testing and Applications, 1991, pp. 441-454, vol. 2, Philadelphia, PA.

Griffith et al, Gas-Filled Panels: A Thermally Improved Building Insulation, pp. 96-102, Berkeley, CA.

* cited by examiner

SYSTEM AND APPARATUS FOR ASSEMBLING AN INFLATABLE INSULATION PANEL

CROSS-REFERENCE TO RELATED APPLICATIONS

This application is a Divisional of U.S. application Ser. No. 12/200,557 filed Aug. 28, 2008 now U.S. Pat. No. 8,021,734, which claims the benefit of U.S. Provisional Application No. 60/968,429 filed Aug. 28, 2007, and incorporated herein by reference in its entirety.

BACKGROUND OF THE INVENTION

Embodiments of this invention relate generally to systems and methods used to insulate an interior of various items such as coolers, refrigerators, containers, automobiles, buildings etc. More specifically, embodiments of the invention pertain to the use of inflatable or gas-filled insulation panels used to insulate such items.

BRIEF DESCRIPTION OF THE INVENTION

An inflatable or gas-filled insulation panel comprises an envelope having two outer sheets sealed together along edges of the sheets and at least one of the sheets has an outer reflective surface. The envelope encases a plurality of internal films that include a polymeric film having a plurality of reflective stripes disposed thereon and spaced apart on the films. In an embodiment, the outer reflective surface(s) and reflective stripes are composed of an aluminum alloy. The two outer sheets may comprise a laminate of a polymeric film and aluminum sheet. Seals are formed along the gaps or areas between the reflective stripes on the films by application of heat and pressure, which causes the films to seal to each other and the outer sheets at spaced apart intervals. A channel is formed between the outer edges of the films and the outer sheets, and a valve disposed at an end of the panel is in fluid communication with the channel for the injection of a fluid, such as an inert gas or air, to inflate panel.

BRIEF DESCRIPTION OF THE DRAWINGS

The present invention can be more easily understood and the further advantages and uses thereof more readily apparent, when considered in view of the following detailed description when read in conjunction with the following figures, wherein.

DETAILED DESCRIPTION OF THE INVENTION

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained. The term "gas-filled" is used herein interchangeably with the term "inflatable" and is intended to describe a panel that is inflatable by injection of a fluid such as an inert gas or air, or any other fluid that may be used to inflate the panel to provide insulation properties.

Figure 1A:
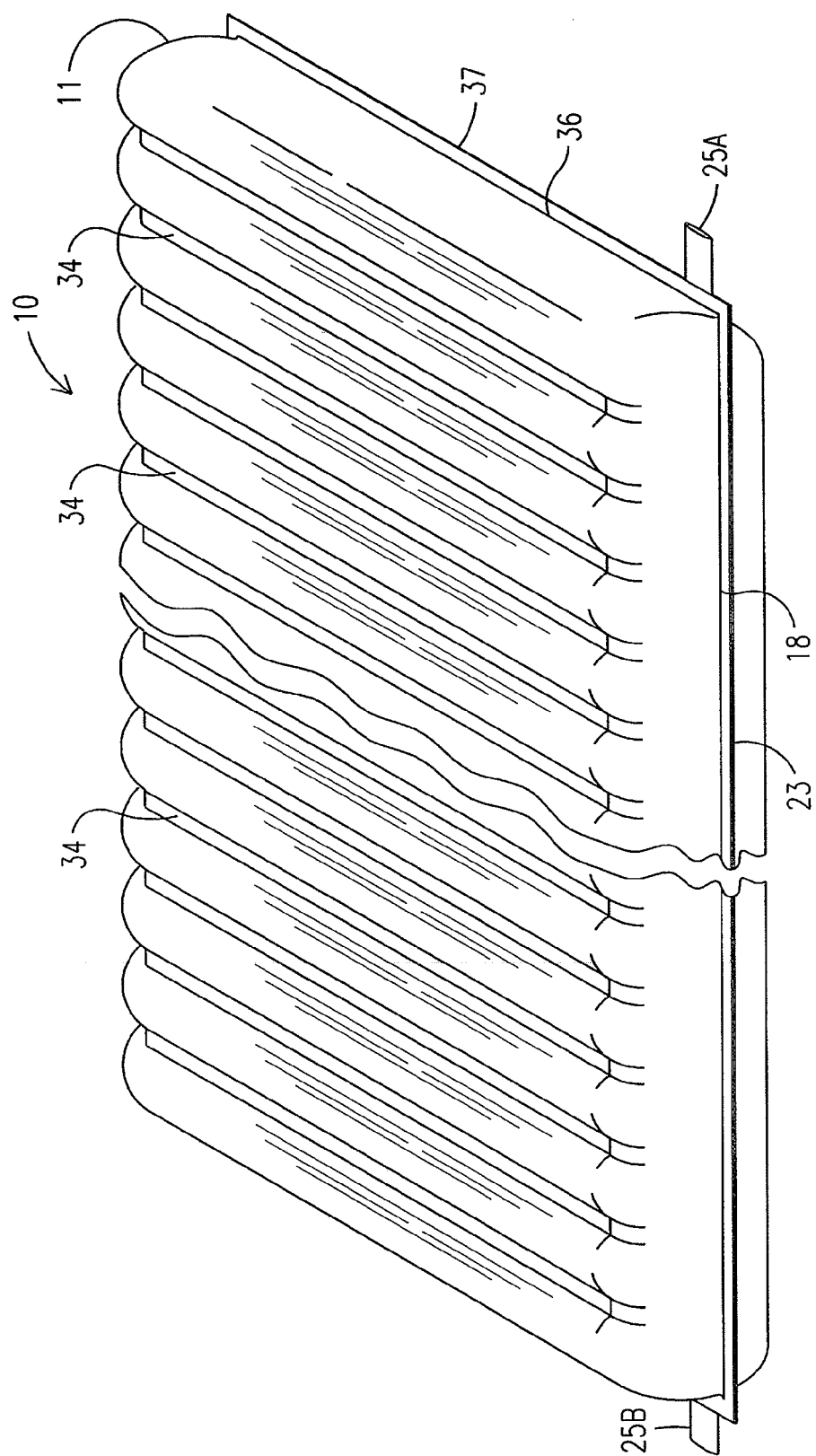
FIG. 1A is a perspective view of an embodiment of a reflective gas-filled insulation panel.
Figure 1B:
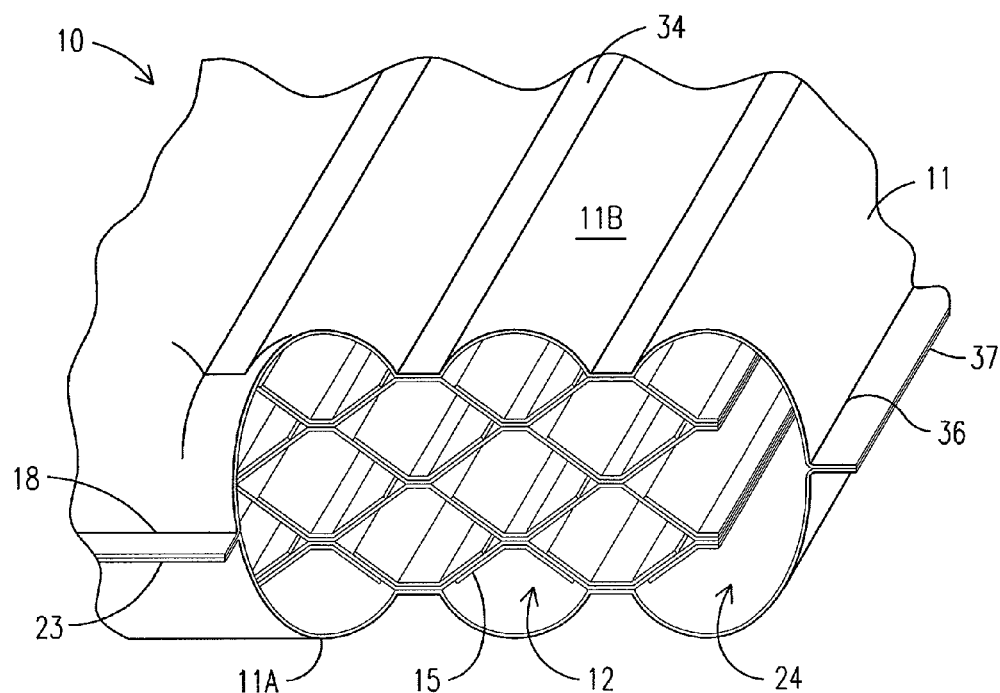
FIG. 1B is a sectional view of the insulation panel take shown in FIG. 1.

With respect to FIGS. 1A and 1B there is illustrated an embodiment of the invention for a reflective gas-filled insulation panel 10 that includes an inflatable aluminum envelope 11 encasing a plurality of interior films 12 or layers that are arranged and sealed relative to one another and the envelope 11 to form the honeycomb baffle arrangement in FIG. 1B. As shown in these and other drawings, the panel 10 includes a gas-filled panel with internal and external reflective surfaces, wherein the reflective surfaces are aluminum. In an embodiment, there may be at least one external surface, or one or more external reflective surfaces.

Figure 2:
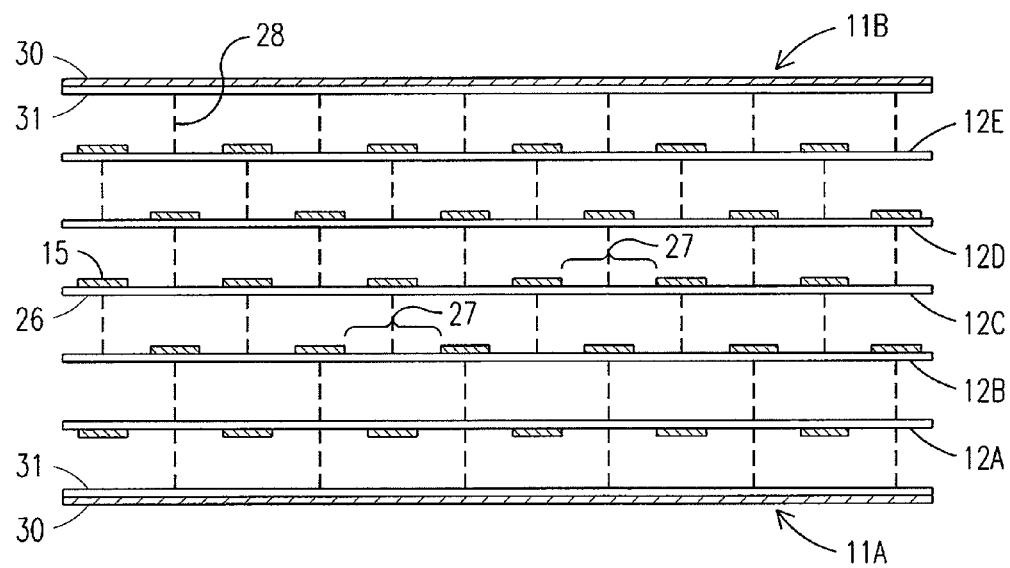
FIG. 2 is a schematic expanded view of the different layers of materials making up the insulation panel and the alignment of metal stripes.

With respect to FIG. 2, the aluminum envelop 11 is composed of two sheets (11A and 11B) of an aluminum laminate material, each sheet comprises a first layer 30 of aluminum and a second layer 31 of polymer films such as polyethylene, which includes a metallocine bonding agent and fire retardant materials. The invention is not limited to the use of aluminum as a reflective surface, and may incorporate other materials, compounds or formulas for bonding agents and fire retardant materials. The first layer 30 may be approximately within a range of about 0.0003 inches to about 0.0007 inches thick aluminum foil. As explained in more detail, and in reference to certain test results, these thicknesses are intended to meet flammability requirements, retention of expansion, and improved thermal performance for building requirements.

Note, that in at least one other embodiment the envelope 11 may comprise the two sheets 11A and 11B with only one or at least one of the sheets, 11A and/or 11B having an outer aluminum layer laminated with the polyethylene. In such a case the other sheet making up the envelope 11 may be one or more polymeric layers sealed to the sheet 11A or 11B The polyethylene second layer 31 is about 0.0025 inches thick grade so the two sheets 11A and 11B each may have a total thickness ranging from about 0.0028 inches to about 0.0032 inches. In addition, the polyethylene or second layer 31 may have a thickness of about 0.0010 inches or greater. The polyethylene films making up the envelope 11, second layer 31 and the interior films 12 is similar in grade and composition and is manufactured by Pliant Corporation located in Schaumberg, Ill., or DanaFilms, Inc. located in Franklin, Ky. Note, while reference is made to polyethylene, any impervious polymeric film may be used that can accept the below referenced metal stripes and adequately bond to aluminum sheets. The lamination may be sourced out and performed by Cleveland Laminating Corporation.

In an embodiment, the polyethylene or polymeric films may comprise a plurality of polyethylene including seven polymeric films bonded together to form a single film, a single nylon film disposed in the middle of six polyethylene films. The outer two polyethylene films may be constructed of a cull extruded process and contain the metallocine bonding agent for securing films 12A and 12E to sheets 11A and 11B respectively. The next two consecutive films are treated with the fire retardant material, so the outer films serve as a barrier between aluminum layers 30 and 31 and the fire retardant material, which could result in degradation to the aluminum layers 30 and 31 over time. The middle nylon film retains air in the panel 10 and/or minimizes or eliminates migration of a fluid (such as air, argon or an inert gas) from the interior of the panel 10.

As shown in FIGS. 1A and 1B seals 18 and 36 are formed by sealing together the two sheets 11A and 11B of aluminum laminate along outer edges 23 (longitudinal edge) and 37 (lateral edge) of the envelope forming one or more interior channels 24 within the panel 10 through which a fluid, preferably a gas such as air or an inert gas, flows to inflate the panel 10. A valve, or in the embodiment shown herein, two valves 25A and 25B are disposed between the aluminum laminate sheets 11A and 11B of the envelope 11 for injection of a desired fluid/gas. The interior films 12 are sealed together relative to one another and to the envelope 11, in such a manner that the films 12 and envelope 11 inflate or expand forming the honeycomb baffle arrangement as a fluid is pumped into the panel 10 and flows through channels 24.

The interior films 12A-12E are illustrated in more detail in FIG. 2 and include a polymeric film 26 such as polyethylene, as described above, that has been "metalized." That is, a plurality of metal stripes 15 metalized to the film 26 and spaced apart on the film 26. The preferred metal is an aluminum alloy and formed as 0.75 inch wide stripes and spaced apart about 0.25 inches on the film 12. The metalization process can be performed by Rolvac located in Dayville, Conn.

As shown in FIG. 2, during an assembly process, the interior films 12A-12E are positioned relative to one another so a metal stripe 15, for example on film 12B, is aligned with a gap 27 positioned between metal stripes 15 on film 12A and 12C. This is done so that when the films are sealed together, the portions of the films 12A-12E without the metal, or the gaps 27 adhere together, and the metal stripes 15 do not adhere to the polyethylene. The dashed lines 28 represent points or areas where the films 12A-12E adhere to one another and to the envelope 11. With this arrangement fluid/gas is allowed to penetrate between the consecutive films 12A-12E and envelope 11 allowing the panel to inflate.

As illustrated, film 12A is positioned with the metal stripes 15 facing the aluminum sheet 11A, and the film 12B, and all films 12C, 12D and 12E are positioned with the metal stripes 15 positioned facing the aluminum sheet 11B. Therefore the polyethylene 26 of the films 12A and 12B abut one another and may fuse together during the assembly process, and by inspection there may appear only four interior films. Accordingly, in reference to FIG. 1B, film 12 adjacent 11A appears a single film, but may indeed be a fusion of two films 12A and 12B. In addition, with film 12A disposed in this position relative to sheet 11A, the film 12A separates from sheet 11A as the envelope inflates. While the above-described invention pertains to an embodiment having five internal films, the invention is not so limited and may contain even a single interior film or more than five films.

An assembly machine used to assemble the panel 10 is illustrated and described in U.S. Pat. No. 6,755,568, which is incorporated herein and manufactured by Convertec a/k/a NuLine Mfg., Corp. located in Denver, Colo. The number of rolls of materials mounted on the machine depends on the number of sheets or layers used to make the panels 10. The embodiments described herein include seven layers of materials, so of course seven rolls of material are needed. The size of the panel 10 may also dictate the width of the rolls of materials. For example in an insulation panel used in building construction, the panels 10 assembled and cut into sections up to seventy inches long and fifteen to eighteen inch wide panels. However, embodiments of the invention are not limited to these dimensions as panel sections of various lengths and widths may be used for building construction and other applications.

Figure 4A:
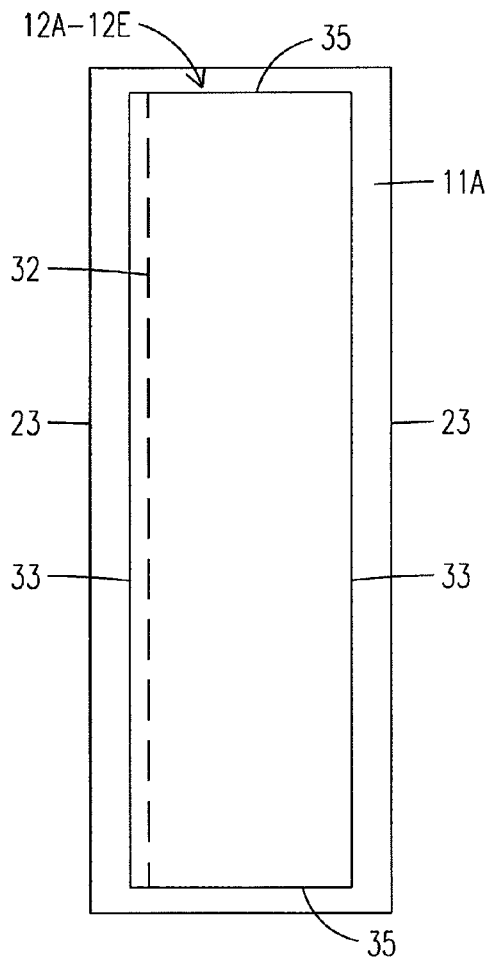
FIGS. 4A-4D illustrate the different step of sealing together the component of the panel.
Figure 4B:
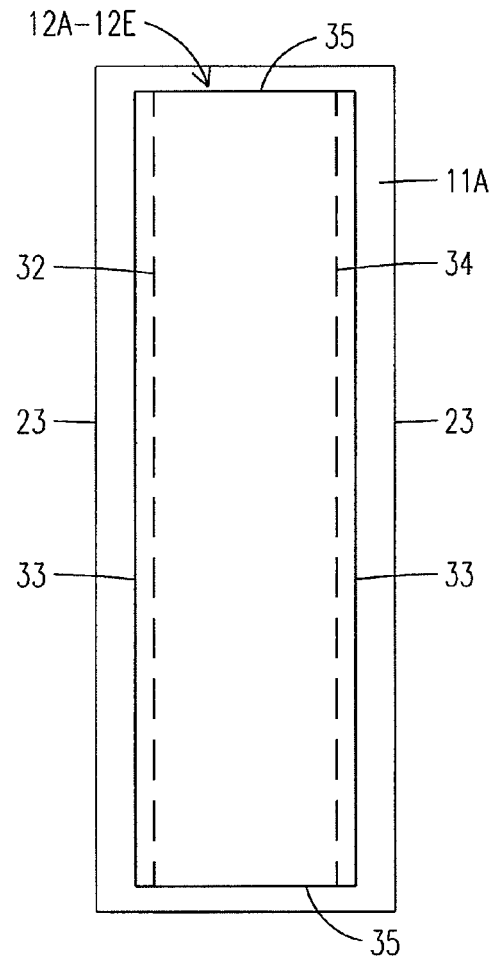

During the assembly process the seals are formed at four different stations or at four different times. With reference to FIG. 4A-4D, there are schematically illustrated four stages of the sealing assembly. In FIGS. 4A and 4B, a smaller rectangle represents the five interior films 12A-12E placed on top of or above the polymeric film 26 of the first aluminum laminate sheet 11A of the envelope 11. As shown, the films 12A-12E may be cut during or before assembly to have dimensions smaller than that of first aluminum sheet 11A. By way of example, for a panel 10 having an envelope width dimension of seventeen inches and a length dimension of sixty-six inches, the films 12A-12E may have a corresponding width of fifteen inches, and corresponding length of sixty-three inches. This provides sufficient spacing to form the above-described interior channels 24. Simultaneously, the valve(s) are sealed to layer 11B at a lateral end. The invention is not limited to these specific dimensions but may include any dimensions necessary to perform a desired function of the panel. As mentioned in a preferred embodiment, the films 12A-12E have smaller width or length dimensions than the envelope 11 for forming the channels 24.

As represented by the dashed line 32, the films 12A-12E are sealed to one another and to the first aluminum sheet 11A along the lateral edges 33 of the films 12A-12E. This first seal 32 is disposed laterally from the edge 33 of the films 12A-12B. A second seal 34 is shown in FIG. 4B, and is disposed along the opposite edge 35 of the films 12A-12E spaced laterally toward seal 32. Each of the seals 32 and 34 represent the sealing of the films 12A-12E to themselves and to sheet 11A along those areas where the polyethylene areas of respective layers or films are in contact. These steps of providing seals 32 and 34 are provided primarily to align the films 12A-12E with one another and relative to sheets 11A and 11B for assembly of the gas-filled panel. In addition, the seals 32 and 34 do not form With respect FIG. 4C, the larger rectangle represents the second aluminum laminate sheet 11B positioned over the first sheet 11A and the films 12A-12E. The dashed rectangle represents the films 12A-12E below the sheet 11B, or sandwiched between both sheets 11A and 11B, and having the longitudinal edges 33 and lateral edges 35. Two seals 18A and 18B are then formed along the length of the sheets 11A and 11B. As shown, the longitudinal seals 18A and 18B are disposed laterally inward of the edge 23 of the sheets 11A and 11B. However, relative to the longitudinal edges 33 of the films 12A-12E, the seals 18A and 18B are disposed toward edges 23 of the aluminum sheets 11A and 11B. Described in another manner, the seals 18A and 18B are disposed between edges 23 of the sheets 11A and 11B and edges 33 of the films 12A and 12E.

The sealing during these first three steps may be done using sufficiently heated die presses that press against the films 12A-12E and sheets 11A and 11B for a sufficient time at a sufficient pressure to form the seals. For example seals may be sufficiently formed at about 290° F. (±10° F.) for a dwell time of about 4.5 seconds (±1.00 seconds) at a pressure of about 25 lbs/in$^2$ to about 40 lbs/in$^2$.

Figure 4C:
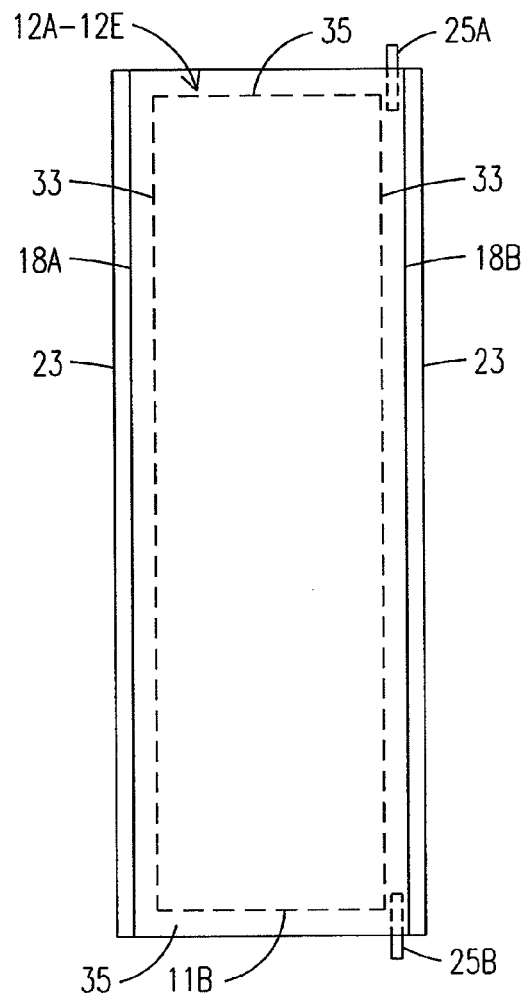
Figure 4D:
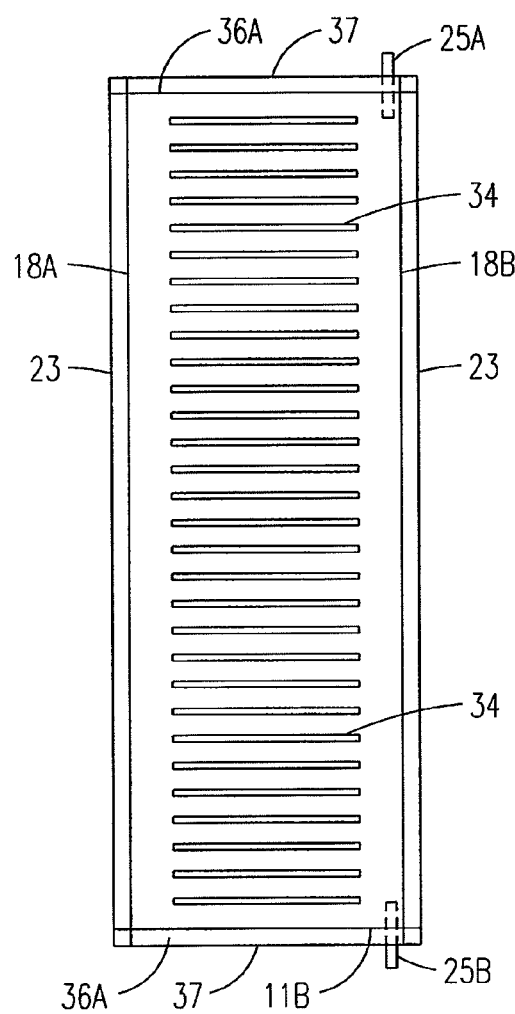

With respect to FIG. 4D, there is shown final sealing steps which include forming lateral end seals 36A and 36B and forming the plurality of seals 34 formed along the films 12A-12E and sheets 11A and 11B that are disposed perpendicular relative to the seals 18A and 18B. In addition, seals 36A and 36B are formed perpendicular to the seals 18A and 18B, and between lateral ends 35 of the films 12A-12E and opposing lateral ends 37 of the sheets 11A and 11B. Note, the valve(s) 25A (25B) is any typical valve used for inflating items and has a blue dye or coating along an inside surface to prevent the valve(s) 25A (25B) from being closed when seals 36A and 36B are formed.

In this step the films 12A-12E are adhered to one another and the sheets 11A and 11B along the seals 34. As shown in FIGS. 1B and 2, the seals 34 are formed at the gaps 27 between the metal stripes 15 to seal the films 12A-12E to one another and to the sheets 11A and 11B. As shown, the seals 34 are spaced laterally inward relative to seals 18A and 18B thereby forming the channel 24 between longitudinal edges 33 and 23 of the films 12A and 12B and sheets 11A and 11B, respectively. The sealing at this final step may be done using sufficiently heated die presses that are pressed against the films 12A-12E and sheets 11A and 11B for a sufficient time at a sufficient pressure to form the seals. For example seals may be sufficiently formed at about 250° F. (±10° F.) for a dwell time of about 4.75 seconds (±1.00 seconds) at a pressure of about 25 lbs/in$^2$ to about 40 lbs/in$^2$.

Figure 3:
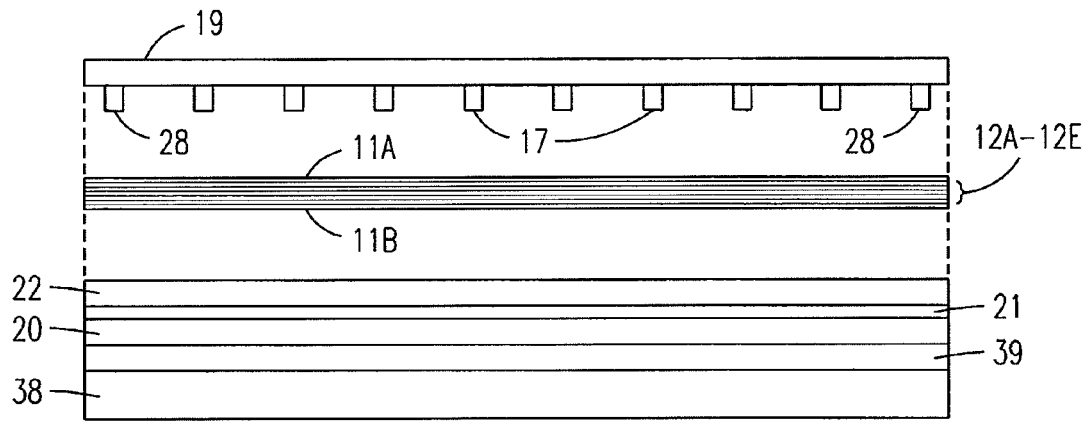
FIG. 3 is a side schematic view of support platen and heating/sealing die that is a component of the machine used to make the insulation panel.

With respect to FIG. 3 there is illustrated a die 19 prepared to press seal the components of the panel for the final sealing step shown in FIG. 4C. In this particular step, it has been found to sufficiently seal the components using the ribbed die 19. A platen 20 is used to support the films 12A-12E and sheets 11A, 11B during the sealing process. More specifically, a ⅛"-¼" high temperature silicone sponge rubber layer 21 is positioned over the platen 20, and a ¼" epdm (ethylene propylene diene monomer) rubber or silicone 22 is positioned over the silicone layer 21. The EPDM durometer measures 50A but can be altered based on the film. In addition, a phenolic insulation 39 is positioned between the platen 20 and a support table 38. The platen 20 is heated using a flexible heat tube. Such a platen assembly provides temperature control of the sealing process so sealing is performed under a consistent/uniform temperature and during repetitive impressions.

Figure 5:
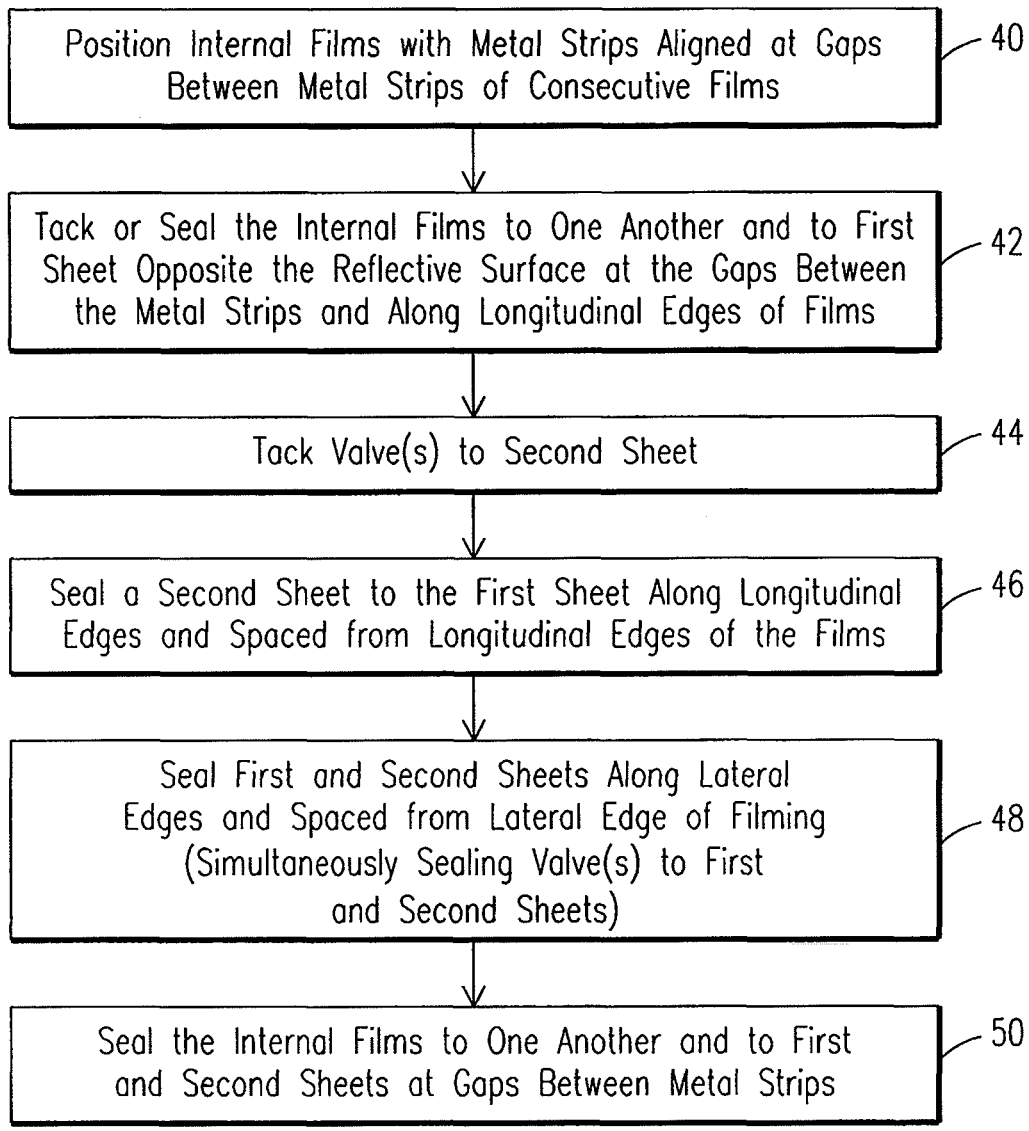
FIG. 5 is a flow chart describing steps to a method of assembling or manufacturing an inflatable insulation panel.

With respect to FIG. 5, there is shown a flow chart describing steps for assembling the inflatable panel. In a first step 40, the films 12A-12B are positioned relative to one another so that the metal stripes 15 are aligned with gaps 27 of consecutive films 12A-12E so the films 12A-12E adhere to one another and to the sheets 11A-11B when sealed. In step 42, the films 12A-12E are sealed relative to one another and the first sheet 11A along lateral edges 23 of the films 12A-12E. This step 42 is performed so that the stripes 15 and gaps 27 on the films 12A-12E maintain alignment relative to one another during the assembly process. Simultaneously, the valve(s) are sealed to layer 11B at a lateral end.

Then in step 44, the valves 25A and 25B are tacked to the second sheet 11B before both are sealed to the first sheet. With respect to step 46 the second sheet 11B is sealed to the first sheet 11A between the longitudinal edges 23 of films 12A-12E and the longitudinal edges 23 of the sheets 11A-11B and between the lateral edges 35 of films 12A-12E. With the longitudinal seals 18A and 18B formed, the valves 25A and 25B is sealed to sheets 11A and 11B at a lateral end thereof as set forth in step 48. In step 48, the lateral seals 36 are formed between respective ends 35 and 37 of the films 12A-12E and the sheets 11A and 11B, thereby simultaneously sealing the sheets 11A and 11B together, and the valves 25A and 25B to the sheets 11A and 11B. With respect to step 50, the internal films 12A-12E are then sealed to one another and to the sheets 11A and 11B at the areas or gaps 27 between the metal stripes 15.

Figure 6:
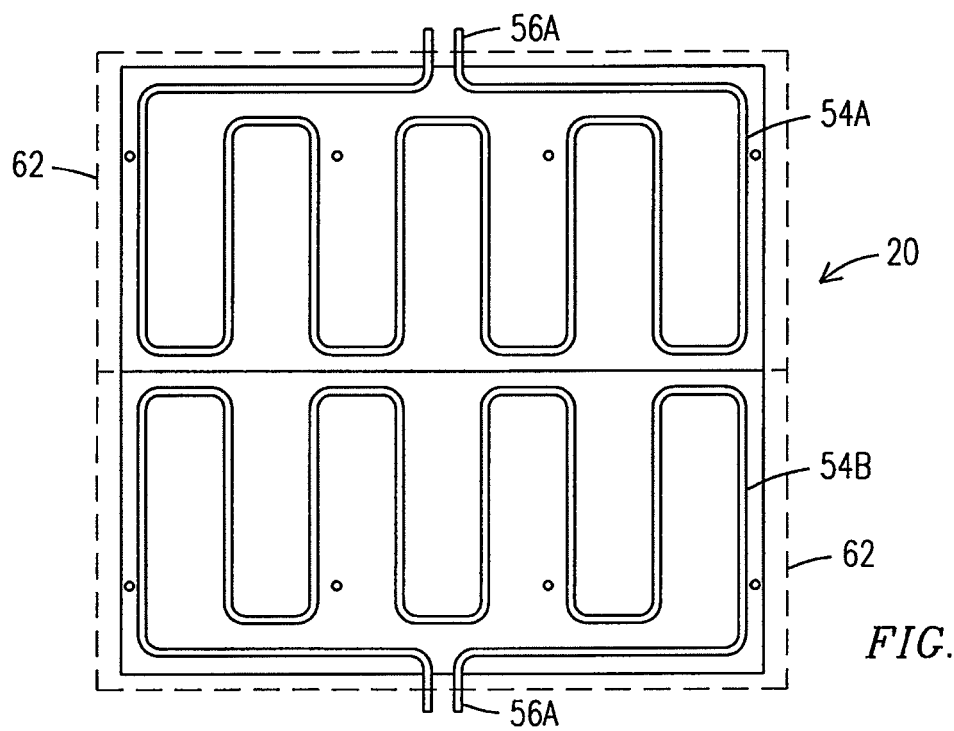
FIG. 6 is a bottom view of a platen used in the process of assembling the inflatable insulation panel.
Figure 7:
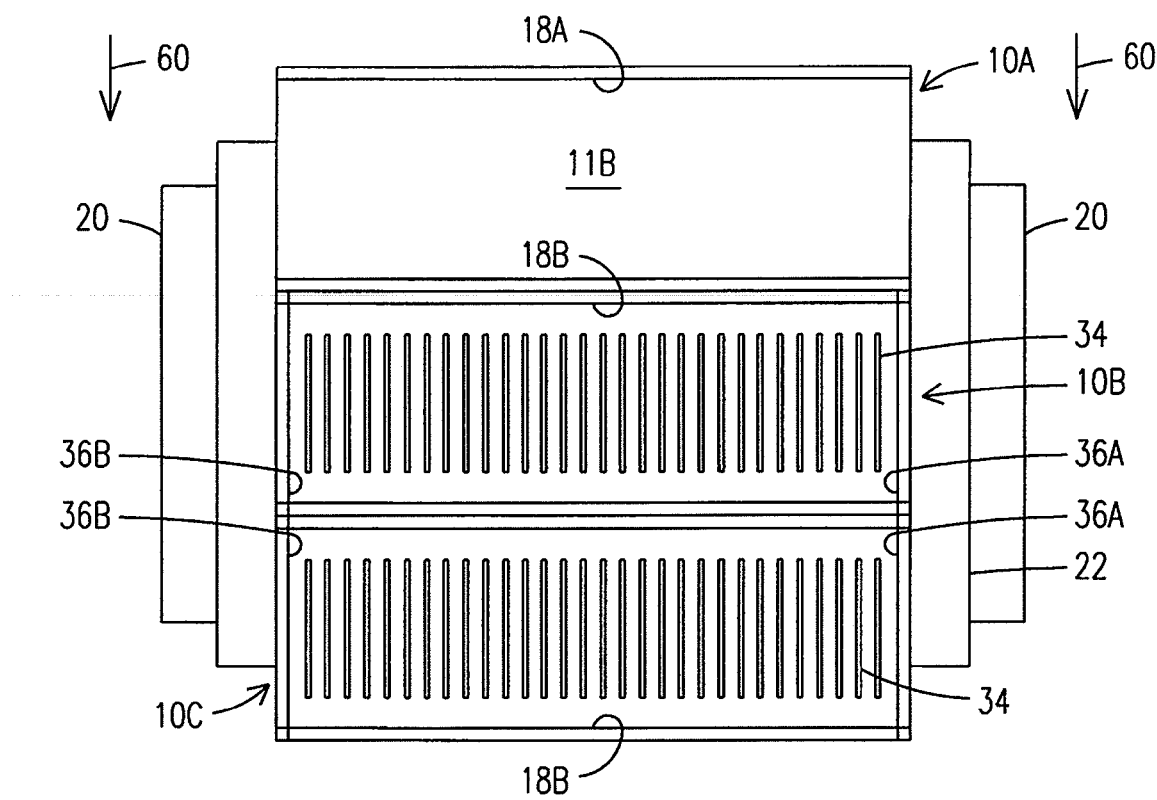
FIG. 7 is a top schematic illustration of inflatable insulation panels being assembled.

In reference to FIGS. 6 and 7, there is illustrated the platen 20 and the use of the platen in assembling the panels 10. More specifically, in FIG. 6, there is shown an underside 52 of the platen 20. As shown, the platen includes two undulating heating tubes 54A and 54B, each of which is connected to a corresponding thermocouple 56A and 56B for heating the platen 20 for practicing the above described sealing steps. Such a platen 20 may be obtained from Watlow Electric Mfg. located in Saint Louis, Mo.

As shown in FIG. 7, in an embodiment two platens 20 are used side by side to assemble panels that are approximately seventeen inches wide and sixty inches long. The width for all the components shown in FIG. 7 is designated W and the length for all components is designated L. Each of the platens 20 is about thirty-seven inches long so the combined platens are about seventy four inches in length (L); and, each of the platens 20 is about forty-eight inches wide. The layers 21 and 22 disposed between platen 20 and panels 10 are preferably about the same length and width of the combined platens 20.

In the particular illustration in FIG. 7, there is shown a final step in the assembly of the panels 10A-10C in which seals 34 The panels 10A-10C, or materials for making the panels 10A-10C are moving in sheet/film form in the direction indicated by arrows 60 across the platens 20. The die 19 (not shown) is about sixty-six inches in length and seventeen wide. The ribs 17 (see FIG. 3) that form the seals 34 are about fifteen inches long, and the outermost ribs 28 (see FIG. 3) that form lateral seals 36A and 36A are seventeen inches in length.

Again, with respect to FIG. 7, the die 19 was first pressed against platens 20 to form seals 34, 36A and 36B on panel 10C, and the sheets 11A (not shown), 11B and films 12A-12E (not shown) are indexed in the direction of arrows 60 to form panel 10B. In the next step, the materials will be advanced or indexed so that panel 10A may be stamped accordingly. As the panel 10A to be formed is positioned over the platens 20, there be a heat transfer relative to the platens 20 and panel 10A which has not been finally heated and sealed. In comparison, the panel 10C has been sealed and heated so the heat transfer between panel 10C and the platens 20 may be of less concern. Accordingly, the heat tubes 54A may require heating independent of heat tubes 54B in order to achieve a desired temperature within a sufficient amount of time to meet production demands. In this manner the two platens 20 provide four heating quadrants 62 each of which may be heated independent of one another to increase flexibility of assembly demands.

In this manner an inflatable or gas-filled insulation panel is provided that has desirable temperature barrier and/or insulation properties. The aluminum, including the aluminum laminate sheets, provides certain advantages over inflatable or gas-filled insulation materials. The exterior aluminum sheets 11A, 11B provides enhanced thermal performance, retains gases within the panel because the aluminum is less permeable than other materials so oxygen cannot seep into the panel, displace the gas and provide exterior structural integrity. In use, the gas-filled panel 10 may be used in combination with other insulation products such as fiberglass insulation or the like, or by itself. In an exemplary embodiment, the panels 10 may be placed over fiberglass insulation in between building frame members for wall frames, attics and the like. The panels 10 may be secured in place by frictional contact with parallel frame members. In another embodiment, for example in an attic, the panels 10 may be disposed on top of insulation and disposed perpendicular to attic frame members, with an insulation material having been placed between the attic frame members. As noted above, the dimensions of the panels 10 may vary according to applications. In one embodiment in which the panels 10 are used in combination with fiberglass insulation for a building in which the fiberglass is about 3.5 inches thick, the panels may be about 1.5 to about 1.8 inches in thickness.

The thermal performances of gas-filled panels (GFP) with internal and external reflective surfaces were measured in the Large-Scale Climate Simulator (LSCS) at the Oak Ridge National Laboratory. Prototype panels filled with argon and panels filled with air were evaluated for both winter and summer conditions. The nominal 1.6-1.8 inch (38.1 mm) thick GFP were installed on top of nominal 3.5-inch (88.9 mm) thick fiberglass batts, having a thermal resistance of value R 13 ft$^2$·h·° F./Btu (RSI 2.29 m2·K/W), to simulate retrofit attic insulation installation. Analysis of the experimental results provided the thermal resistance of the batts, the thermal resistance of the gas-filled panels, and the radiant barrier contributions to the overall thermal resistance between the attic floor and the roof sheathing.

The first system consisted of nominal R 13 ft$^2$·h·° F./Btu (RSI 2.29 m2·K/W) fiberglass batts on the attic floor. The second system had air-filled panels installed on top of the batts while the third system had argon-filled panels installed on top of the batts. The gas-filled panels were installed perpendicular to the ceiling joists in both cases. The three systems were tested with the same thermal boundary conditions to facilitate comparisons of the steady-state performances. Winter conditions included an outside temperature 25° F. (−3.9° C.) and inside temperature 70° F. (21.1° C.). The summer conditions included an outside temperature of 115° F. (46.1° C.) and roof sheathing temperature of 150° F. (65.6° C.) due to simulated solar radiation. The thermal resistivity of the batt insulation and the gas-filled panels were evaluated using ASTM C 518 to provide supplementary data. See, "Standard Test Method for Steady-State Thermal Transmission Properties by Means of the Heat Flow Meter Apparatus", 2006 *Annual Book of ASTM Standards*, Vol. 4.06 (2006) pp. 153-167.

The installation of both air-filled GFP and argon-filled GFP on top of fiberglass insulation resulted in added thermal resistance in the attic space during both summer and winter conditions. Three components of the increase in attic thermal resistance were measured including the thermal resistance of the batt insulation, the gas-filled panel thermal resistance and the attic air thermal resistance.

TABLE I

Thermal Resistance Contributions

| Contributions | Summer | | Winter | |
|---|---|---|---|---|
| | Argon | Air | Argon | Air |
| GFP | 5.6 | 5.9 | 4.5 | 4.6 |
| Radiant Barrier | 6.2 | 6.0 | 0.7 | 0.5 |
| Fiberglass batt change | 0.5 | 0.6 | 0.2 | −0.1 |
| Total | 12.3 | 12.5 | 5.4 | 5.0 |

Note:
Panel Thicknesses: Argon 1.6 inches; Air 1.8 inches

The installation of air and argon gas-filled panels on top of fiberglass batts resulted in a reduction in the operating temperature of the batts in the summer simulations with a resulting increase in the R-value of the batts of about 0.56 ft$^2$·h·° F./Btu (0.099 m$^2$·K/W), and a change in the R-value of −0.20 ft$^2$·h·° F./Btu (−0.04 m$^2$·K/W) in the R-value for winter conditions.

The argon gas-filled panel had R-value of about 5.6 ft$^2$·h·° F./Btu (0.99 m$^2$·K/W) under summer conditions and an R-value of in the range 4.5 ft$^2$·h·° F./Btu (0.79 m$^2$·K/W) under winter conditions. The air gas-filled panel had an R-value in the range 5.9 ft$^2$·h·° F./Btu (1.04 m$^2$·K/W) under summer conditions and an R-value of about 4.6 ft$^2$·h·° F./Btu (0.81 m$^2$·K/W) under winter conditions. In addition, the argon gas-filled panels increased attic thermal resistance by 6.16 ft$^2$·° F./Btu (1.08 m$^2$·K/W). There was an increase in attic thermal resistance of 0.72 ft$^2$·h·° F./Btu (0.13 m$^2$·K/W) under winter conditions. For air gas-filled panels, there was an increase in the attic thermal resistance of about 6.0 ft$^2$·h·° F./Btu (1.05 m$^2$·K/W) for summer conditions, and an increase of about 0.46 ft$^2$·h·° F./Btu (0.081 m$^2$·K/W) for winter conditions. The total of the previously listed contributions to the thermal performance was about 12.3 to 12.5 ft$^2$·h·° F./Btu (2.17 to 2.20 m$^2$·K/W) for summer conditions; and, the overall contribution for simulated winter conditions on average was about 5.0 ft$^2$·h·° F./Btu (0.88 m$^2$·K/W).

In addition flammability testing was performed in accordance with ASTM E-84, Standard Test Method for Surface Burning Characteristics of Building Materials. The test resulted in a Class A rating with a Flame Spread less 25 and smoked developing rating less than 450.

While exemplary embodiment of the invention has been described with reference to an exemplary embodiment, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc., do not denote any order or importance, but rather the terms first, second, etc., are used to distinguish one element from another.

What is claimed is:

1. A system for assembling an inflatable insulation panel having an envelope with an outer reflective surface and a plurality of internal films, each film being of a polymeric material and having a plurality of reflective surfaces thereon and spaced apart, comprising:

at least one heating platen for supporting a first and second sheet of laminated material, at least one of which includes the outer reflective surface and an inner polymeric surface, and the internal films positioned between the first and second sheet, said heating platen for providing heat to seal the films to one another and to the first and second sheets;

an insulating layer positioned on the platen disposed between the platen and the first and second sheets of laminated material; and, a die press for applying pressure against the two sheets and films while the platen provides a source of heat wherein the die includes a plurality of ribs having a plurality of internal ribs aligned with gaps in the films between the spaced apart reflective surfaces and two external ribs positioned outside the internal ribs along the die press, parallel to the internal films, disposed at corresponding ends thereof for forming lateral seals extending the width of the panel at lateral ends of the panel.

2. The system of claim 1, wherein the die applies a pressure of about 25 lb/in$^2$ to about 40 lb/in$^2$ and the platen is heated to a temperature of about 250° F., both for a dwell time of about 4.75 seconds.

3. The system of claim 1, wherein the heating platen includes a plurality of quadrants the temperature of each quadrant can be controlled independent of one another.

4. The system of claim 1, wherein a width of the first and the second sheet is greater than a width of the internal films based on lateral edges of the first and second sheets being positioned outside lateral edges of the internal films.

5. The system of claim 4, wherein the internal ribs form lateral seals along the insulation panel between the lateral edges of the internal films and that the external ribs form lateral seals along the insulation panel between the lateral edge of the internal film and the lateral edge of the first or second sheet.

6. The system of claim 1, wherein the insulating layer comprises:
   a first silicone rubber layer disposed between the platen and the first and second sheets of laminated material; and
   a second silicone rubber layer disposed between the first silicone rubber layer and the first and second sheets.

7. The system of claim 6, wherein the first silicone rubber layer is a high temperature silicone sponge rubber layer with a thickness in a range between ⅛" and ¼", and wherein the second silicone rubber layer is an ethylene propylene diene monomer rubber with a thickness of ¼".

8. The system of claim 7, wherein a diameter measurement of the ethylene propylene diene monomer rubber of the second silicone rubber layer is 50 A.

9. A platen assembly for assembling an inflatable insulation panel having an envelope with an outer reflective surface and a plurality of internal films, each film being of a polymeric material and having a plurality of reflective surfaces thereon and spaced apart, said platen assembly comprising:
   at least one heating platen for supporting a first and second sheet of laminated material, at least one of which includes the outer reflective surface and an inner polymeric surface, and the internal films positioned between the first and second sheet, said heating platen for providing heat to seal the films to one another and to the first and second sheets;
   a first insulating layer positioned on the platen disposed between the platen and the first or second sheets wherein the first insulating layer comprises a first silicone rubber layer disposed between the platen and the first or second sheets and a second silicone rubber layer disposed between the first silicone rubber layer and the first or second sheets;
   a second insulating layer positioned between the heating platen and a support table below the heating platen; and
   a die press for applying pressure against the two sheets and films while the platen provides a source of heat wherein the die includes a plurality of ribs having a plurality of internal ribs aligned with gaps in the films between the spaced apart reflective surfaces and two external ribs positioned outside the internal ribs along the die press, parallel to the internal films, disposed at corresponding ends thereof for forming lateral seals extending the width of the panel at lateral ends of the panel.

10. The system of claim 9, wherein the die applies a pressure of about 25 lb/in$^2$ to about 40 lb/in$^2$ and the platen is heated to a temperature of about 250° F., both for a dwell time of about 4.75 seconds.

11. The system of claim 9, wherein the heating platen includes a plurality of quadrants the temperature of each quadrant can be controlled independent of one another.

12. The system of claim 9, wherein a width of the first and the second sheet is greater than a width of the internal films based on lateral edges of the first and second sheets being positioned outside lateral edges of the internal films.

13. The system of claim 12, wherein the internal ribs form lateral seals along the insulation panel between the lateral edges of the internal films and that the external ribs form lateral seals along the insulation panel between the lateral edge of the internal film and the lateral edge of the first or second sheet.

14. The system of claim 9, wherein the heating platen comprises a flexible heat tube configured to provide the source of heat at a controlled temperature such that the application of pressure from the die press is applied at a uniform temperature during repetitive impressions.

15. The system of claim 9, wherein the heating platen comprises a pair of heating tubes on an underside of the platen, said heating tubes connected to a respective thermocouple.

16. The system of claim 9, wherein the first silicone rubber layer is a high temperature silicone sponge rubber layer with a thickness in a range between ⅛" and ¼", and wherein the second silicone rubber layer is an ethylene propylene lene monomer rubber with a. thickness of ¼".

17. The system of claim 16, wherein a durometer measurement of the ethylene propylene diene monomer rubber of the second silicone rubber layer is 50 A.

* * * * *